Patented Feb. 23, 1954

2,670,276

UNITED STATES PATENT OFFICE 2,670,276

MANIPULATION AND STORAGE OF BROMINE

Rudolf Bloch, Isaac Schnerb, and David Kaplan, Jerusalem, Israel

No Drawing. Application May 24, 1949, Serial No. 95,144

Claims priority, application France September 25, 1948

6 Claims. (Cl. 23—216)

This invention relates to the manipulation and storage of bromine.

Elementary bromine is difficult to manipulate and to keep in storage in leaden vessels (which term, in this specification and the appended claims, is intended to include lead-coated vessels made from other materials), for although fundamentally inert towards lead, yet in practice the bromine tends to corrode vessels in which it is stored or subjected to certain manipulations, e. g. distillation or condensation. Thus, it has been found that leaden storage vessels are suddenly perforated by the bromine after some time, though in many cases no apparent damage had occurred even for weeks. This destruction, for which no explanation could be found so far, takes place even where the vessel is made from exceptionally pure lead. Nor has careful drying of the bromine and exclusion of moisture been of any avail.

For the aforesaid reason it is customary to store and handle bromine in glass or earthenware vessels. These are more expensive and breakable than leaden vessels and cannot conveniently be made as large as the latter. It would, therefore, be preferable to use leaden vessels if the corrosion thereof could be prevented.

The invention has as its object to provide a manner of storing or manipulating bromine in leaden vessels without damage to the latter.

The invention is based on the new discovery that the aforesaid attack of bromine on lead is brought about and catalysed by the presence of hydrogen bromide and that in the complete absence of hydrogen bromide no such attack develops. The hydrogen bromide appears to dissolve the metal with the formation of bromide and of hydrogen which re-combines with another portion of bromine whereby fresh hydrogen bromide is formed. Now, any kind of impurity having a reducing action on the bromine is a potential source of hydrogen bromide. Ordinary dust may act in this direction, or fragments of organic matter like wood, cork or rubber deriving from stoppers or plugs, or gaseous agents, such as hydrogen sulfide or carbon monoxide in the presence of moisture.

Based on this new discovery the present invention consists therein that the bromine is kept in storage or subjected to distillation or other manipulation in leaden vessels in the presence of an oxidizing agent adapted to decompose hydrogen bromide with the formation of elementary bromine. The oxidizing agent may be distributed throughout the liquid bromine or be kept at or above the liquid bromine level within the vessel.

The oxidizing agent may be introduced as such into the vessel, or be generated therein by the reaction of a small proportion of the total bromine present.

For example, lead peroxide is particularly suitable as an oxidizing agent since it can be generated on the surface of the lead walls of the vessel by anodic oxidation.

Other metal oxides come equally into regard for the purposes of this invention, e. g. manganese dioxide.

Another class of suitable oxidizing agents is formed by the salts of various oxygen acids of bromine, e. g. bromates and hypobromites. They may be added to the bromine in the form of an aqueous solution supernatant on the bromine, or be generated within the vessel by the addition to the bromine of a supernatant layer of an alkaline reacting aqueous liquor, e. g. a sodium or potassium hydroxide, carbonate or bicarbonate solution, or a calcium hydroxide suspension, wherein elementary bromine dissolves with the formation on the one hand of bromide, and on the other hand of hypobromite and ultimately bromate.

Or else, the oxidizing substance may be disposed in solid form in the space of the vessel above the liquid-bromine level, e. g. on trays or in baskets suspended therein, or on wall projections. In such a case one may use, for example, metal oxides or peroxides as aforesaid, or else an alkaline reacting substance capable of forming hypobromite by the action of gaseous bromine, e. g. calcium oxide or hydroxide, sodium or potassium bicarbonate or carbonate in lumps or fragments, or the like.

Experiments have shown conclusively that by the presence of the oxidizing agents adapted instantaneously to decompose any hydrogen bromide present or forming in the vessel, leaden manipulating and storage vessels can be made to withstand the action of bromine for a virtually unlimited time even under such conditions as would normally be conducive to a rapid corrosion of the lead, namely, in the presence of reducing agents, particularly fragments of organic matter or $H_2S$.

This invention is illustrated by the following examples to which it is, of course, not limited.

Example 1

Into a cylindrical storage tank with cambered bottom, having a capacity of 4 cubic meters and a diameter of 2 meters made from iron and lined internally with lead, bromine and a 5% aqueous solution of potassium bromate are introduced. It is preferred first to pour in the bromate solution and thereafter the bromine. A suitable amount of bromate solution is 5 liters per square meter of bromine surface.

The example may be modified thereby that the bromate solution is replaced by a 1 N aqueous sodium or potassium hydroxide solution.

*Example 2*

A bromine transport flask of iron lined with a coat of lead 1 mm. thick, is filled with $\frac{1}{10}$ N aqueous sulfuric acid and connected to the positive pole of a source of direct current. A lead rod connected to the negative pole of the source of current is inserted through the neck into the flask without contact therewith. Direct current is then passed at about 4 volts through the flask until the lead coat has assumed brown colouring due to the formation of lead peroxide. The current is then switched off, the negative electrode removed from the flask, the sulfuric acid poured out, and the flask is rinsed with water and dried, then the bromine to be stored or transported is introduced therein. It is advantageous to pretreat the bromine by allowing it to run through a tower containing lead oxide in pieces, or by making a 5% aqueous bromate solution bubble through the bromine.

*Example 3*

A perforated cylindrical lead cage is suspended in a lead-coated iron bromine storage tank. The cage is filled with granulated lead peroxide, or crystalline potassium bromate, or lumps of calcium bromide-hypobromite (the bromine analogue of bleaching powder), its perforations being made so large only as not to allow the granules, crystals or lumps to fall out. The tank is then ready to receive the bromine to be stored.

*Example 4*

An apparatus for the distillation of bromine, either for purification or in order to separate it from mixtures containing or developing it, may comprise a leaden boiling vessel and a descending lead condenser. The usual rapid corrosion of the container and condenser is prevented according to the invention in a twofold manner: The boiling mixture in the container is admixed with so much of an aqueous bromate solution or a lead peroxide sludge, or a suspension of bromate crystals in bromine, that the mixture contains substantially one equivalent amount of active oxygen for each 100 equivalent amounts of bromine. As regards the condenser, this is protected from corrosion by a filling of lead peroxide in lumps.

We claim:

1. In the method of maintaining liquid bromine in a leaden vessel in the presence of moisture and substances which reduce bromine to hydrogen bromide in the presence of moisture at atmospheric conditions the step of preventing corrosion of said vessel which comprises adding to said bromine an oxygen-containing compound capable of oxidizing hydrogen bromide to elemental bromine at atmospheric conditions and selected from the group consisting of $PbO_2$, $MnO_2$ and salts of oxygen acids of bromine.

2. The method of claim 1 in which said compound is preformed and introduced as such into said vessel.

3. The method of claim 1 in which said compound is a bromate.

4. The method of claim 1 in which said compound is a hypobromite.

5. The method of claim 1 in which said compound is a salt of an oxygen acid of bromine, said salt being formed in said vessel by the reaction of bromine with alkaline reacting liquors selected from the group consisting of aqueous solutions of alkali hydroxides, carbonates and bicarbonates, and aqueous suspensions of calcium hydroxide.

6. The method of claim 1 in which said compound is a salt of an oxygen acid of bromine and is formed by contact of the bromine with an added alkaline reacting compound.

RUDOLF BLOCH.
ISAAC SCHNERB.
DAVID KAPLAN.

References Cited in the file of this patent

UNITED STATES PATENTS

| Number | Name | Date |
|---|---|---|
| 103,253 | Stieren | May 17, 1870 |
| 110,662 | Juhler | Jan. 3, 1871 |
| 181,617 | Arvine | Aug. 29, 1876 |
| 1,870,308 | Behrman | Aug. 9, 1932 |
| 1,885,029 | Dressel | Oct. 25, 1932 |
| 1,917,762 | Grebe | July 11, 1938 |
| 2,163,877 | Hooker | June 27, 1939 |
| 2,336,448 | Cox | Dec. 7, 1943 |
| 2,380,254 | McCullough | July 10, 1945 |
| 2,472,635 | Weber | June 7, 1949 |

FOREIGN PATENTS

| Number | Country | Date |
|---|---|---|
| 551,789 | Great Britain | Mar. 10, 1943 |

OTHER REFERENCES

Prescott and Johnson's "Qualitative Chemical Analysis," 5th ed., pages 345, 347. D. Van Nostrand Co.

J. W. Mellor's "A Comprehensive Treatise on Inorganic and Theoretical Chemistry," vol. 2, page 90; vol. 7, pages 573, 745. Longmans, Green and Co., N. Y.

Lowry's "Inorganic Chemistry," 2nd ed., 1931, pp. 348, 349. MacMillan and Co., Ltd., London.

"Chem. and Met. Eng.," September 1944, page 112.

Lange's "Handbook of Chemistry," 4th ed., pages 8 and 9. Handbook Publishers, Inc., Sandusky, Ohio.

"Materials for Bromine Containers," by George S. Haines, I. and E. Chem., vol. 41, No. 12, pages 2792–2794.

McPherson and Henderson's "A Course in General Chemistry," 3rd ed., pages 164, 366, 367, 640. Ginn and Co., N. Y.

Uhlig's "Corrosion Handbook," pp. 212–213, 1948 ed. John Wiley and Sons, Inc., N. Y.